United States Patent [19]

Baker et al.

[11] E Patent Number: Re. 32,793

[45] Reissued Date of Patent: Nov. 29, 1988

[54] LATCHING SOLENOID MECHANISM

[75] Inventors: Keith F. Baker, Naperville; Richard M. Kowalski, Morton Grove; Ralph E. Mishler, Deerfield, all of Ill.

[73] Assignee: Synchro-Start Products, Inc., Skokie, Ill.

[21] Appl. No.: 75,356

[22] Filed: Jul. 20, 1987

Related U.S. Patent Documents

Reissue of:

[64] Patent No.: 4,623,860
Issued: Nov. 18, 1986
Appl. No.: 747,923
Filed: Jun. 24, 1985

[51] Int. Cl.[4] ..... H01H 9/20

[52] U.S. Cl. ..... 335/170; 335/171; 335/253; 700/231

[58] Field of Search ..... 335/167, 168, 170, 171, 335/253, 254; 200/321

[56] References Cited

U.S. PATENT DOCUMENTS

| | | | |
|---|---|---|---|
| 1,326,359 | 12/1919 | Mahoney | 335/254 |
| 3,235,777 | 2/1966 | Hatashita | 335/254 |
| 3,503,021 | 3/1970 | DeBruin et al. | 335/254 |
| 3,893,053 | 7/1975 | Onatsevich et al. | 335/254 |
| 3,983,520 | 9/1976 | Sakata | 335/253X |
| 4,494,096 | 1/1985 | Fuzzell | 335/170 |

FOREIGN PATENT DOCUMENTS

| | | | |
|---|---|---|---|
| 1035771 | 8/1958 | Fed. Rep. of Germany | 335/253 |

*Primary Examiner*—George Harris
*Attorney, Agent, or Firm*—Kinzer, Plyer, Dorn, McEachran & Jambor

[57] ABSTRACT

An internal latching mechanism for a solenoid comprises a cylindrical ball race on the main solenoid plunger with a plurality of balls disposed in aligned apertures in the ball race. First and second axially displaced fixed retainers, interconnected by a shoulder, define the limits of ball movement in one radial direction for the unactuated and actuated positions of the main plunger, and third and fourth axially displaced retainers perform the same function for the opposite radial direction; the fourth retainer is a movable retainer connected to a latch release plunger. When the main solenoid coil is energized to drive the main plunger to its actuated position, the balls displace the fourth retainer enough to allow the balls to move into engagement with the second and fourth retainers; when the main coil is de-energized the balls engage the shoulder between the first and second retainers to latch the main plunger in actuated position.

15 Claims, 2 Drawing Sheets

16 (POSITION 16A)
A

LATCHING SOLENOID MECHANISM

Matter enclosed in heavy brackets [ ] appears in the original patent but forms no part of this reissue specification; matter printed in italics indicates the additions made by reissue.

BACKGROUND OF THE INVENTION

In most solenoids, energization of a main operating coil produces a strong electromagnetic field that drives a main plunger, against the bias of a return spring, from a normal or unactuated position to an actuated position. The direction of movement of the plunger may be inwardly of the solenoid, as it is driven to its actuated position; alternatively, the solenoid may be constructed to have the plunger move outwardly of the solenoid housing when driven to its actuated position. In most conventional solenoids, deenergization of the main coil allows the return spring to drive the plunger back to its normal, unactuated position.

There is another type of solenoid, however, that incorporates an auxiliary release coil as well as the main operating coil used to drive the solenoid plunger. This type of solenoid, known as a latching solenoid, incorporates a mechanism to latch the solenoid plunger in its actuated position where the main coil is deenergized. To restore the plunger to its original position, the auxiliary coil is energized to release the latching mechanism and allow restoration by operation of the main plunger return spring. This release action may conveniently be effected by movement of a small latch release plunger incorporated in or connected to the latch mechanism. Latching solenoids of this kind may be employed in a number of different applications, particularly in diesel engines and turbines for which continued operation is independent of the electrical system. An example of a latching solenoid particularly applicable to use in the control of the fuel pump of a diesel engine is presented in Fuzzell U.S. Pat. No. 4,494,096, issued Jan. 15, 1985.

In many applications, particularly those pertaining to engine control, a latching solenoid is subject to severe use requirements; a diesel truck engine, for example, may be started and stopped repeatedly in each day of use. For such applications, the durability of the latching mechanism in the solenoid is a critical factor. In this regard, the latching arrangement disclosed in the aforementioned Fuzzell patent does not afford the durability desirable in many applications; this is equally true of a number of other previously known solenoid latching mechanisms.

In engine control applications and in others, it may be necessary to provide for manual actuation of the solenoid in the event of a failure in the electrical energizing system. Thus, in the event of such a failure, it may be necessary to actuate the solenoid manually to latched condition in order to start the engine or, conversely, it may be essential to actuate the solenoid manually to its normal unactuated condition in order to shut off the engine. In general, previously known manual actuation arrangements for a latching solenoid have presented appreciable technical difficulties and have been less than fully satisfactory with respect to durability and convenience and effectiveness of manual operation.

SUMMARY OF THE INVENTION

It is a principal object of the present invention, therefore, to provide a new and improved latching solenoid incorporating a latch mechanism that is simple and inexpensive in construction but that affords an extremely long operational life.

Another object of the invention is to provide a new and improved latching solenoid which incorporates durable and effective and conveniently usable means for manual operation of the solenoid to either its actuated condition or its unactuated condition in the event of any electrial failure internally of the solenoid or in its energizing circuits.

Accordingly, the invention relates to a latching solenoid of the kind comprising a main plunger axially movable between an unactuated position and an actuated position, a main coil energizable to drive the main plunger to its actuated position, a main return spring for driving the main plunger to its unactuated position, a latching mechanism for holding the main plunger in its actuated position when the main coil is de-energized, a latch release plunger axially movable through a given displacement from a normal position to a latch release position to release the latch means and allow the main plunger to return to its unactuated position, a latch spring urging the latch release plunger to its normal position, and an auxiliary coil energizable to drive the latch release plunger to its latch release position. The solenoid incorporates an improved latch mechanism comprising a cylindrical ball race mounted on the main plunger and having a plurality of circumferentially distributed ball-receiving apertures, and a corresponding plurality of balls disposed in the ball race apertures. First and second axially displaced fixed retainer means of different diameters, interconnected by a shoulder, define the limits of displacement of the balls in one radial direction for the unactuated and actuated positions, respectively, of the main plunger; and third and fourth axially displaced retainer means of different diameters define the limits of displacement of the balls in the opposite radial direction when the balls engage the first and second retainer means, respectively, the fourth retainer means comprising a movable retainer connected to the latch release plunger. The balls displace the fourth retainer means as the main plunger nears its actuated position, through an axial distance no larger than the given displacement for the latch release plunger but sufficient to allow the balls to ride along the shoulder into contact with the second retainer means and permitting the fourth retainer means to return to its original position, the balls engaging the shoulder to latch the main plunger in its actuated position until the latch release plunger is driven to its latch release position.

DESCRIPTION OF THE PREFERRED EMBODIMENTS

FIGS. 1-6

Figures 1, 2, 5, 6, 7, 8:
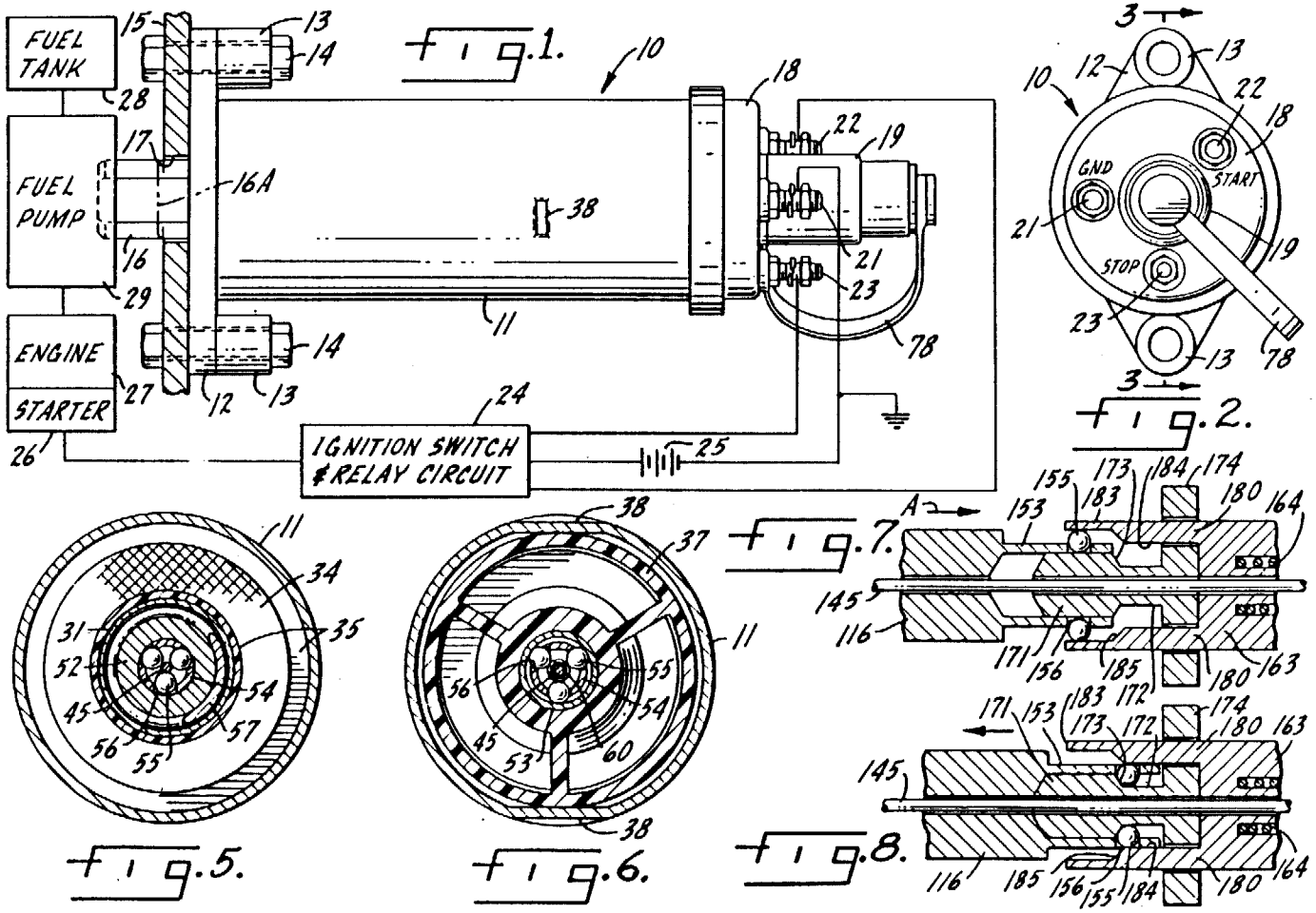
FIG. 1 is a side elevation view of a latching solenoid incorporating an improved latching mechanism in accordance with the invention, with a schematic illustration of a typical operating environment in a diesel engine.
FIG. 2 is an end view of the latching solenoid shown in FIG. 1.
FIG. 5 is a detail section view taken approximately along line 5—5 in FIG. 3.
FIG. 6 is a detail section view taken approximately along line 6—6 in FIG. 4.
FIG. 7 is a simplified detail section view, similar to a part of FIG. 3, of another embodiment of the solenoid latching mechanism, in unactuated condition.
FIG. 8 shows the latching mechanism of FIG. 7 in actuated condition.

FIGS. 1 and 2 afford a simplified illustration of the environment in which a latching solenoid incorporating the present invention is likely to be employed, a diesel engine. The solenoid 10 illustrated in FIGS. 1 and 2 incorporates two coils, a main operating coil and an auxiliary release coil. The main coil is employed to actuate the solenoid from a first, unactuated condition to a second, actuated condition; the latch mechanism of the present invention holds the solenoid in its actuated condition. The auxiliary coil is utilized to release the latch mechanism so that the solenoid returns to its original operating condition. The two internal coils of solenoid 10 are not illustrated in FIGS. 1 and 2; they appear in FIGS. 3 and 4.

As shown in FIGS. 1 and 2, solenoid 10 includes a cylindrical housing 11 of magnetic steel tubing, affixed at one end to a mounting flange plate 12. Two bushings 13 are mounted on flange plate 12. Two bolts 14 extend through bushings 13 and are used to mount solenoid 10 on a support plate 15 associated with the fuel pump 29 of a diesel engine 27. The plunger 16 of solenoid 10 projects through an aperture 17 in support plate 15.

At the end of solenoid 10 opposite flange plate 12, housing 11 is closed by a molded resin end cover 18. A dust cover 19 is removably mounted on end cover 18. Three electrical connection posts project outwardly from the solenoid end cover 18; these include a ground connection post 21, a start connection post 22, and a stop connection post 23.

The simplified electrical circuit shown for solenoid 10 in FIG. 1 includes an ignition switch and relay circuit 24, to which the two start and stop connection posts 22 and 23 are connected. The ground connection post 21 is shown connected to the negative terminal of a battery 25 which has its positive terminal connected to the ignition switch and relay circuit 24. Circuit 24 is also connected to the starter 26 of diesel engine 27. Fuel is supplied to engine 27, from a fuel tank 28, by a fuel pump 29. Fuel pump 29 is mechanically engaged by solenoid plunger 16.

In its usual environment, the operation of solenoid 10 is the same as described in the previously mentioned U.S. Pat. No. 4,494,096. Solenoid 10 may initially be assumed to be in an unactuated operating condition in which its plunger 16 projects outwardly of the solenoid in the fuel pump 29; for this condition engine 27 is not running. To start engine 27, the ignition switch and relay circuit 24 is actuated to energize starter 26. At the same time, the main coil in solenoid 10 is energized for a brief interval, through the circuit connection to start post 22, pulling plunger 16 to its retracted, actuated position as indicated by phantom outline 16A. This allows fuel pump 29 to function, feeding fuel to engine 27 from tank 28. When the main coil of solenoid 10 is deenergized, the solenoid plunger 16 does not return to its original extended position. Instead, plunger 16 is latched in its actuated position 16A by an internal latch mechanism, as described hereinafter.

When it is desired to interrupt operation of engine 27, the ignition switch and relay circuit 24 is actuated to energize the auxiliary coil in solenoid 10, through the circuit comprising stop connection post 23. Energization of the auxiliary coil releases the latching mechanism within the solenoid, which restores the main solenoid plunger to its extended, unactuated position 16. This movement of plunger 16 to its original position shuts off fuel pump 29. Because the engine no longer receives a supply of fuel, it stops.

In the event of failure of any electrical circuit within solenoid 10, or in the event of a failure in the external electrical circuits for the solenoid, the solenoid can be manually actuated to either of its operating conditions. This is accomplished by removing dust cover 19, allowing access to convenient means for manual actuation of the solenoid mechanism as described in connection with FIGS. 3-6.

Figures 3, 4:
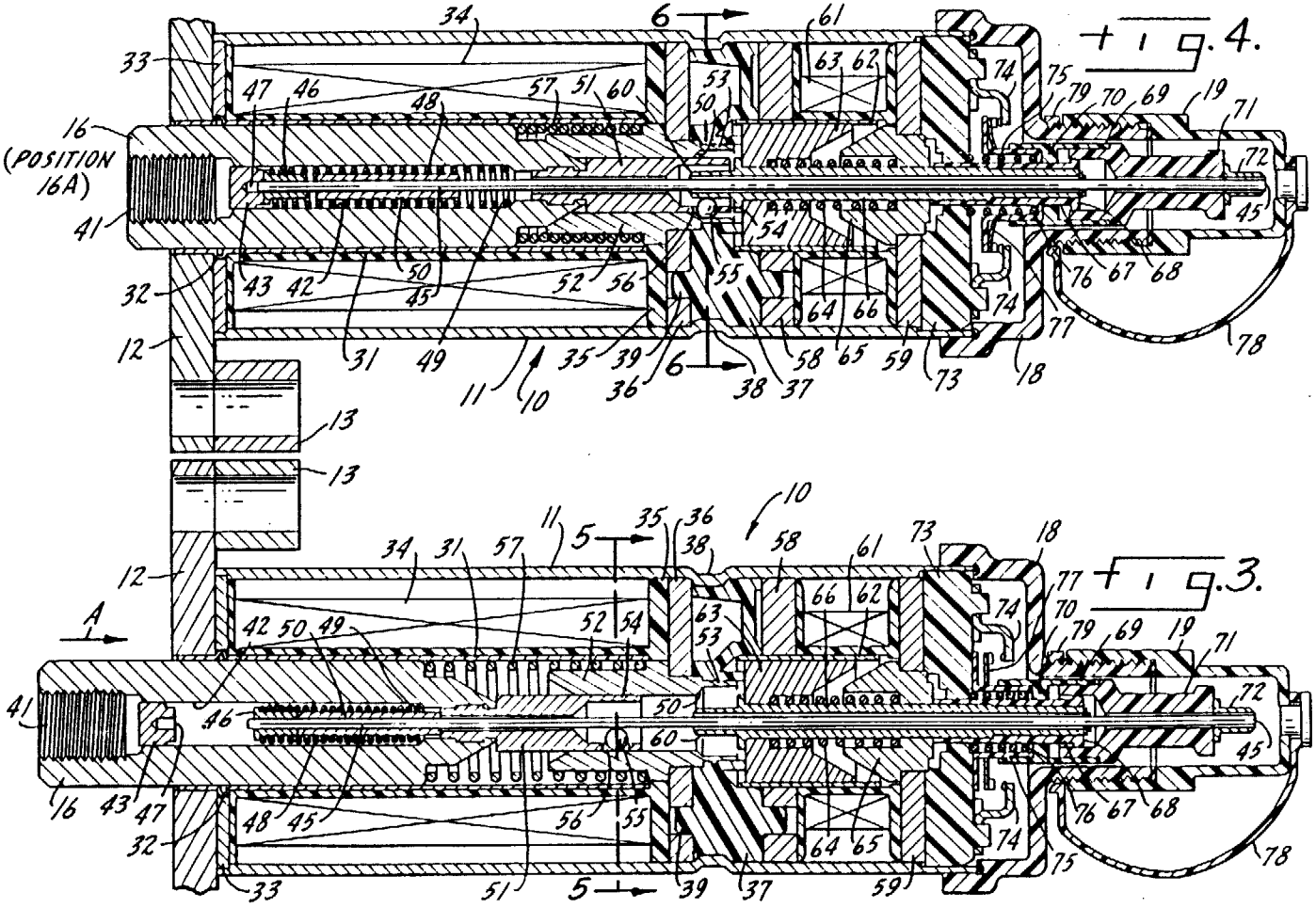
FIG. 3 is a section view, on a larger scale, of the latching solenoid, taken approximately as indicated by line 3—3 in FIG. 2, with the solenoid in its unactuated condition.
FIG. 4 is a section view like FIG. 3 but showing the solenoid in its latched, actuated condition.

The internal construction of solenoid 10, incorporating a preferred embodiment of the latching mechanism and other features of the present invention, is shown in FIGS. 3 and 4, supplemented by FIGS. 5 and 6. Referring to FIGS. 3 and 4, it is seen that the main solenoid plunger 16 is slidably positioned within an elongated brass tube 31 that extends axially within solenoid 10. Tube 31 is formed with an annular protrusion or bulge 32 aligned with a location washer 33 that is affixed to flange plate 12. The main coil 34 of solenoid 10 is mounted in encompassing relation to tube 31 and plunger 16. One end of the support bobbin 35 for coil 34 engages the location washer 33; the other end of bobbin 35 abuts an annular steel end plate 36 that in turn engages an annular molded resin spacer 37. Spacer 37 is held in fixed position within housing 11 by two or more indentations 38 extending inwardly of the housing. A lug 39 formed integrally with spacer 37 projects into a location aperture in end plate 36 to orient the end plate within housing 11.

The outer end of the main solenoid plunger 16, in the embodiment illustrated in FIGS. 3 and 4, includes a threaded opening 41 affording a convenient means for completing a mechanical connection to fuel pump 29 (FIG. 1). The threaded opening 41 communicates with an internal axis bore 42 in plunger 16, the left-hand end of bore 42 (FIGS. 3 and 4) being closed by an overtravel plug 43. Plug 43 is preferably formed of brass or other non-magnetic material.

Bore 42 in the main plunger 16 encompasses one end of a rod 45 that extends axially throughout the length of solenoid 10. A stop sleeve 46, preferably formed of leaded copper, is affixed to the end of rod 45 within bore 42. Sleeve 46 engages plug 43 when the solenoid is in its latched condition (FIG. 4). A short length of rod 45 projects beyond stop sleeve 46 and is aligned with a receptacle 47 in the overtravel plug 43. An overtravel spring 48 is disposed within bore 42 in encompassing relation to the outer end of rod 45; one end of spring 48 engages stop sleeve 46 and the other end of the spring engages a shoulder 49 formed by a reduction in the internal diameter of bore 42. A sleeve 50 inside spring 48 limits the compression of the spring.

An annular non-magnetic plunger bushing 51 is affixed to the inner end of the main solenoid plunger 16, in encompassing relation to rod 45. Bushing 51 is positioned within a stationary annular magnetic attraction bushing 52 that is affixed to end plate 36. The left-hand end of the fixed bushing 52 is engageable with plunger 16 to limit inward movement of the plunger, as shown in FIG. 4. The right-hand end 53 of the stationary bushing 52 extends into a central opening in spacer 37; this end of bushing 52 is larger in diameter than the left-hand portion of the bushing and is joined thereto by a shoulder 50.

The right-hand end of plunger 51 is formed as a cylindrical ball race 54. Ball race 54 includes three (or more) circumferentially distributed apertures 56 for retention of a corresponding number of ball bearings 55. The disposition of ball bearings 55 is further illustrated in FIGS. 5 and 6.

The left-hand portion of fixed bushing 52 affords a first retainer means defining the radial outward limit of displacement for balls 55 when plunger 16 is in its unactuated position, FIG. 3. The right-hand end 53 of bushing 52 constitutes a second retainer means that defines the radial outward limit of displacement for the balls when plunger 16 is in its actuated position, FIG. 4. Rod 45 comprises a third retainer means, limiting radial inward movement of balls 55 when the balls engage the first retainer means, the left-hand portion of bushing 52. A fourth ball retainer means is provided by one end 60 of a shaft 66 described hereinafter; this fourth retainer means defines the inward radial limit for balls 55 when engaged by the second retainer means 53.

A main plunger return spring 57 is disposed within brass tube 31. One end of spring 57 engages a shoulder on plunger 16. The other end of return spring 57 engages the fixed attraction bushing 52.

Immediately to the right of spacer 37, as seen in FIGS. 3 and 4, a magnetic steel front location washer 58 is mounted within housing 11. Washer 58 is positioned in fixed, axially spaced relation to a magnetic steel rear location washer 59. An annular auxiliary coil 61 is disposed between washers 58 and 59, in encompassing relation to a brass tube 62. An annular latch release plunger core 63 of magnetic material is axially slidably positioned within tube 62. One end of a latch release plunger return spring 64 engages core 63. The other end of spring 64 engages a fixed annular magnetic attraction member 65 that is mounted within the rear location washer 59.

The latch release plunger core 63 is mounted upon an elongated hollow steel latch release plunger shaft 66. Rod 45 extends axially through the hollow shaft 66; the shaft is free to slide along the rod. A molded resin sleeve 67 is mounted on shaft 66, beyond attraction member 65. The outer end of sleeve 67 has a shoulder 68 of enlarged diameter positioned to engage an internal flange 70 of an annular bushing 69 disposed in encompassing relation to sleeve 67. Bushing 69 is preferably a molded resin member and is bonded to another molded resin bushing 71 mounted in encompassing relation to the right-hand end of rod 45 and axially slidable on the rod. A cap and stop member 72 is affixed to this end of rod 45. The combination of bushings 69 and 71 affords a handle for manual actuation of solenoid 10 from its actuated condition to its unactuated condition, whereas cap 72 permits manual actuation of the solenoid to its latched, actuated condition, all as described hereinafter.

An annular insulator base 73, preferably formed of molded resin, is fixedly mounted within the right-hand end of housing 11 as shown in FIGS. 3 and 4. A pair of fixed electrical contacts 74 that are incorporated in the electrical energizing circuit for release coil 61 are mounted on base 73. The electrical connections from contacts 74 to coil 61 and other internal electrical connections have not been illustrated to avoid undue complication in the drawings.

A cup-shaped movable contact carrier cap 75 having an axial aperture through its end wall is slidably mounted upon sleeve 67. A latch contact spring 76 is positioned within cap 75, with one end of spring 76 engaging the end wall of the cap and the other end of the spring engaging insulator base 73. Two flexible electrical contacts 77 are mounted upon carrier cap 75, in alignment with contacts 74. In the unactuated condition for solenoid 10 (FIG. 3) the end wall of the contact carrier cap 75 is engaged by shoulder 70 on bushing 69 so that spring 76 is held in compressed condition. It will be seen that elements 73–17 constitute a relay; this relay is incorporated in the electrical operating circuit for auxiliary coil 61.

As shown in FIGS. 3 and 4, dust cap 19 is threaded onto an axially projecting portion of the solenoid end cover 18. Dust cover 19 includes a retainer strap 78, one end of which constitutes a retainer ring 79 threaded onto end cover 18. The other end of strap 78 is rotatably secured to the main body of dust cover 19 so that the dust cover can be unscrewed and removed from end cover 18 but remains attached thereto.

ELECTRICAL OPERATION, FIGS. 1–6

FIG. 3 affords a starting point for description of the operation of solenoid 10; in FIG. 3 the solenoid is shown in its unactuated condition with plunger 16 extended so that fuel pump 29 (FIG. 1) is shut off. Overtravel spring 48 is compressed, the main and release plunger return springs 57 and 64 are both expanded (released), and the latch coil contact spring 76 is compressed. The relay contacts 74, 77 in the electrical circuit for auxiliary coil 61 are open. Balls 55 are restrained, radially, by engagement with the first retainer means, bushing 52, and the third retainer means, rod 45.

To actuate solenoid 10 to the latched condition shown in FIG. 4, its main operating coil 34 is energized. As previously noted, this is accomplished simultaneously with energization of engine starter 26 (FIG. 1). When coil 34 is energized, plunger 16 and its bushing 51 and ball race 54 are driven to the right by the magnetic field generated by the coil, as indicated by arrow A in FIG. 3, compressing the main plunger return spring 57. The magnetic circuit includes washer 33, flange plate 12, and plunger 16, attraction bushing 52, end plate 36, and housing 11, which completes the magnetic circuit back to washer 33 and flange plate 12.

As plunger 16 is pulled into solenoid 10, in the direction of arrow A, the space available to overtravel spring 48 between elements 46 and 49 expands, permitting spring 48 to expand so that the force exerted by spring 48 biasing rod 45 to the left is reduced. Ultimately, spring 48 is relaxed sufficiently to allow spring 76 to expand, driving handle bushing 69,71 and rod 45 a short distance to the right to the position of FIG. 4, and closing the relay contacts 74 and 77. Further, as plunger 16 continues in the direction of arrow A, the ball bearings 55 come into engagement with the left-hand end 60 of the latch release plunger shaft 66, which, as noted above, is the fourth retainer means for balls 55. As a consequence, the plunger release shaft 66 and core 63 are shifted through a short distance in the direction of arrow A. This distance is substantially less than the displacement of core 63 and shaft 66 during a subsequent latch release operation, as described hereinafter.

The movement of the latch release plunger shaft 66 and retainer 60 creates sufficient clearance so that as plunger 16 continues its movement the ball bearings 55 are cammed outwardly, riding along shoulder 50 into contact with the larger diameter portion 53 of attraction bushing 52, the second ball retainer; this occurs as plunger 16 and bushing 51 near the end of their travel. As soon as the ball bearings move radially outwardly into contact with the retaining cylindrical wall 53 core 63, shaft 66 and the fourth retainer 60 are restored to their original, normal positions by spring 64. At this juncture the second and fourth retainers 53 and 60 determine the radial positions of balls 55.

The inward movement of plunger 16,51 ends when plunger 16 engages the left-hand end of attraction bushing 52; this is the actuated position for the main solenoid plunger. At this point, solenoid 10 is in the operating condition illustrated in FIG. 4. Coil 34 is subsequently deenergized, but solenoid 10 remains latched in the condition of FIG. 4 because balls 55 engage the shoulder 50 on attraction bushing 52 and do not permit bushing 51 (or plunger 16) to return to the original unactuated position of FIG. 3. Accordingly, plunger 16,51 remains latched in the actuated position shown in FIG. 4. In this operating condition for solenoid 10, the main plunger return spring 57 is compressed but all of the remaining springs 48, 64, and 76 are in their relaxed, expanded conditions.

To return solenoid 10 to its original unactuated condition, FIG. 3, from the actuated latched condition shown in FIG. 4, auxiliary coil 61 is briefly energized through the relay contacts 74 and 77, which have been closed as described above. When coil 61 is energized, the latch release plunger core 63 is driven to the right by the magnetic field generated by the coil, the magnetic circuit including the front location washer 58, core 63, attraction member 65, rear location washer 59, and the portion of housing 11 between washers 58 and 59. Core 63 and its shaft 66 move to the right until the core engages attraction member 65.

In the latched, actuated condition of FIG. 4, balls 55 have been maintained in engagement with shoulder 50 on the fixed attraction bushing 52 by the end retainer portion 60 of release plunger shaft 66. As previously noted, however, movement of release plunger core 63 causes a corresponding movement of shaft 66, since core 63 is affixed to shaft 66. As a consequence, the ball bearings 55 are now free to move axially inwardly, and this action is effected by the force of the strong return spring 57 driving the main plunger 16 and its bushing 51 axially outwardly of solenoid 10, in a direction opposite arrow A, the balls riding back up shoulder 50 because they are no longer restrained by member 60. As a consequence, plunger 16 returns to the extended unactuated position shown in FIG. 3.

As plunger 16 moves back to its unactuated position, overtravel spring 48 is compressed and ultimately pulls rod 45 to the left through a short distance to the position of FIG. 3. During this movement, the shoulder 70 on bushing 69 on the right-hand end of rod 45 engages the contact carrier cap 75, moving it a short distance to the left to compress spring 76 and open the relay contacts 74 and 77. The movement of rod 45 is interrupted when cap 75 bottoms out against spacer 73 as shown in FIG. 3. The opening of the relay contacts deenergizes coil 61 and permits the latch release plunger, comprising core 63 and shaft 66, to return to its original position. Thus, it is seen that the momentary energization of auxiliary coil 61, automatically interrupted by the opening of the relay contacts 74 and 77, is effective to restore solenoid 10 from the latched, actuated condition of FIG. 4 to the released, unactuated condition of FIG. 3. When solenoid 10 is utilized in a diesel engine in the manner illustrated in FIG. 1, this action shuts down the flow of fuel through pump 29 and shuts off engine 27 (FIG. 1).

MANUAL ACTUATION, FIGS. 1-6

In the event of an electrical failure of either of the coils 34 and 61 in solenoid 10, a failure of the relay comprising contacts 74 and 77, or any other failure in the internal or external electrical circuitry of solenoid 10, it may be necessary to actuate the solenoid manually.

As a first example, it may be assumed that the diesel engine 27 is running and that some failure has occurred in the energizing circuit for release coil 61, or in the coil itself, at a time when it is desirable or necessary to stop the engine. In these circumstances, dust cover 19 is removed from end cover 18, affording access to bushing 69,71, which constitutes a handle for manual release of solenoid 10. Handle 71 is pulled to the right, as seen in FIG. 4, which causes the shoulder 70 on the associated bushing 69 to engage shoulder 68 on the end of the latch release plunger shaft 66. Continued outward movement of handle 71 then pulls shaft 66 and core 63 to the right in the same manner as if coil 61 had been energized. In this way, the retainer end 60 of shaft 66 in the latch mechanism is disengaged from balls 55 so that the solenoid is restored to the released condition of FIG. 3 by action of return spring 57 in the same manner as previously described.

In the event of a failure of coil 34 or its energizing circuit, it is still possible to actuate solenoid 10 from the unactuated condition of FIG. 3 to the actuated latched condition of FIG. 4, as would be necessary to start engine 27. Again, dust cover 19 is removed. In this instance, the end cap 72 affixed to rod 45 is grasped with a pair of pliers or similar gripping tool and rod 45 is pulled to the right. Because overtravel spring 48 is compressed, the movement of rod 45 causes a corresponding movement of solenoid plunger 16 and bushing 51, the same basic movement as afforded in normal electrical operation by energization of coil 34. In this way, solenoid 10 can be manually actuated from the released condition of FIG. 3 to the latched condition of FIG. 4, making it possible to start the engine even though there has been an electrical failure precluding effective operation through energization of main coil 34.

FIGS. 7 and 8

FIGS. 7 and 8 afford a simplified illustration of another embodiment of the solenoid latching mechanism of the invention. In FIG. 7, that latching mechanism is illustrated in the unactuated released condition for the solenoid; FIG. 8 shows the same latching mechanism in the actuated latched condition of the solenoid.

In FIGS. 7 and 8, the main solenoid plunger 116 again affords a cylindrical ball race 153 with apertures 156 in which balls 155 are disposed. Radial inward movement of balls 155 is limited, in the unactuated condition shown in FIG. 7, by engagement of the balls with a first fixed retainer 171. Retainer 171 is of larger diameter than a second fixed retainer 172 that is axially displaced from retainer 171. Retainers 171 and 172 are interconnected by an inclined shoulder 173. These retainer means 171,172 are all part of a fixed member 174 that may constitute a non-magnetic spacer or that, as shown, may be a part of the magnetic system of the solenoid.

The latch mechanism of FIGS. 7 and 8 further comprises a latch release plunger 163 with an associated return spring 164. Plunger 163 includes a plurality of arms 180 projecting through apertures in member 174; there is one arm 180 for each ball 155. The outer end of each arm 180 affords a third retainer 183 that engages one of the balls 155 and defines an outer limit for radial movement of the ball for the unactuated condition of the solenoid; see FIG. 7. Each arm 180 also affords a fourth retainer 184, of smaller diameter than retainer 183. Retainers 184 limit inward movement of balls 155 for the actuated latched condition of the mechanism illustrated in FIG. 8. A rod 145, corresponding to previously described rod 45, extends axially through the latching mechanism.

Operation of the latching mechanism of FIGS. 7 and 8, whether effected electrically or manually, is essentially the same as described for the mechanism shown in FIGS. 3–6. Starting from the released or unactuated condition shown in FIG. 7, the main plunger 116 is driven to the right as indicated by arrow A. As plunger movement continues, balls 155 engage a shoulder 185 between the third and fourth retainers 183 and 184. As a consequence, the latch release plunger 163 is driven a short distance in the direction of arrow A; as in the previous embodiment, this distance is preferably less than the release displacement for plunger 163 but sufficient to allow the balls to move along shoulders 173 and 175 into engagement with the second and fourth retainers 172 and 184.

This brings the mechanism to the actuated and latched condition shown in FIG. 8. In this condition, balls 155 engage the shoulder 173 between the two fixed retainers 171 and 172. As a consequence, plunger 116 cannot return to its original unactuated position and remains latched in the actuated position of FIG. 8 even though the main coil of the solenoid is deenergized. To release the latching mechanism and allow the solenoid to return to its original operating conditions, release plunger 163 is shifted to the right from the position shown in FIG. 8. This frees balls 155 for radial outward movement and allows the main return spring of the solenoid to restore main plunger 116 to its original unactuated position, FIG. 7.

CONCLUSION

The latching mechanisms of the present invention are relatively inexpensive and simple to manufacture. They are extremely durable, affording an operating life measurable in hundreds of thousands of operations. Nevertheless, the latch and release functions are consistently and positively performed. The latch mechanisms provide for simple and convenient manual operation in the event of an electrical failure within the solenoid or in its energizing circuits.

We claim:

1. In a latching solenoid of the kind comprising a main plunger axially movable between an unactuated position and an actuated position, a main coil energizable to drive the main plunger to its actuated position, a main return spring for driving the main plunger to its unactuated position, a latching mechanism for holding the main plunger in its actuated position when the main coil is de-energized, a latch release plunger axially movable through a given displacement from a normal position to a latch release position to release the latch means and allow the main plunger to return to its unactuated position, a latch spring urging the latch release plunger to its normal position, and an auxiliary coil energizable to drive the latch release plunger to its latch release position, an improved latch mechanism comprising:

a cylindrical ball race mounted on the main plunger and having a plurality of circumferentially distributed ball-receiving apertures;

a corresponding plurality of balls disposed in the ball race apertures;

first and second axially displaced fixed retainer means of different diameters, interconnected by a shoulder, defining limits of displacement of the balls in one radial direction for the unactuated and actuated positions, respectively, of the main plunger;

and third and fourth axially displaced retainer means of different diameters defining limits of displacement of the balls in the opposite radial direction when the balls engage the first and second retainer means, respectively, the fourth retainer means comprising a movable retainer connected to the latch release plunger;

the balls displacing the fourth resistor means as the main plunger nears its actuated position, through an axial clearance distance no larger than the given displacement for the latch release plunger but sufficient to allow the balls to ride along the shoulder into contact with the second retainer means and permitting the fourth retainer means to return to its original position, the balls engaging the shoulder to latch the main plunger in its actuated position until the latch release plunger is driven to its latch release position.

2. A latching solenoid according to claim 1 in which the third retainer means comprises a rod extending axially through the main plunger and the latch release plunger, the fourth retainer means comprises a sleeve slidably mounted on the rod, and the third and fourth retainer means limit radial inward movement of the balls.

3. A latching solenoid according to claim 1 in which the fourth retainer means is affixed to the latch release plunger so that the latch release plunger is moved through the clearance distance, against the bias of the latch spring, conjointly with movement of the fourth retainer means, and in which the latch spring restores the latch release plunger and the fourth retainer means to their original positions to complete latching of the main plunger.

4. A latching solenoid according to claim 3 in which the third retainer means comprises a rod extending axially through the main plunger and the latch release plunger, the fourth retainer means comprises a sleeve slidably mounted on the rod, and the third and fourth retainer means limit radial inward movement of the balls.

5. A latching solenoid according to claim 1 and further comprising:

a rod extending axially through the main plunger and the latch release plunger, in sliding relation thereto, with one end of the rod terminating in a bore in the main plunger and the other end projecting outwardly beyond the latch release plunger to a position accessible for manual actuation;

resilient connection means, comprising an overtravel spring, interconnecting the rod and the main plunger within the recess in the main plunger to permit limited relative axial movement therebetween, the overtravel spring being compressed when the main plunger is in its unactuated position;

the main plunger being manually actuated from its unactuated position to its latched, actuated position by pulling the rod axially outwardly, and the overtravel spring restoring the rod approximately to its original position when pulling is interrupted.

6. A latching solenoid according to claim 5 in which the third retainer means comprises a portion of the rod and the fourth retainer means comprises a sleeve that is a part of the latch release plunger, slidably mounted on the rod, and the third and fourth retainer means limit radial inward movement of the balls.

7. A latching solenoid according to claim 5 and further comprising:

a handle mounted in encompassing relation to the outer end of the rod; and shoulder means, on the latch release plunger, positioned for positive engagement by a portion of the handle;

the latch release plunger being manually actuated from its normal position to its latch release position by pulling the handle axially outwardly against the bias of the overtravel spring and the latch spring.

8. A latching solenoid according to claim 7 in which the third retainer means comprises a portion of the rod and the fourth retainer means comprises a sleeve that is a part of the latch release plunger, slidably mounted on the rod, and the third and fourth retainer means limit radial inward movement of the balls.

*9. In a latching solenoid of the kind comprising a main plunger axially movable between an unactuated position and an actuated position, a main return spring for driving the main plunger to its unactuated position, a latching mechanism for holding the main plunger in its actuated position, a latch release plunger axially movable through a given displacement from a normal position to a latch release position to release the latch means and allow the main plunger to return to its unactuated position, a latch spring urging the latch release plunger to its normal position, and a release coil energizable to drive the latch release plunger to its latch release position, an improved latch mechanism comprising:*

*a ball race mounted on the main plunger and having a plurality of circumferentially distributed ball-receiving apertures;*

*a plurality of balls disposed in the ball race apertures;*

*first and second axially displaced fixed retainer means of different diameters, interconnected by a shoulder defining limits of displacement of the balls in one radial direction for the unactuated and actuated positions, respectively, of the main plunger;*

*and third and fourth axially displaced retain means of different diameters defining limits of displacement of the balls in the opposite radial direction when the balls engage the first and second retainer means, respectively;*

*one of the retainer means comprising a movable retainer connected to the latch release plunger;*

*the balls displacing the movable retainer means, as the main plunger nears its actuated position, through an axial clearance distance sufficient to allow the balls to ride along the shoulder away from the first retainer means and into contact with the second retainer means and permitting the latch release plunger to return to its original position, the balls engaging the shoulder to latch the main plunger in its actuated position until the latch release plunger is driven to its latch release position.*

*10. A latching solenoid according to claim 9, in which:*

*the fourth retainer means is the movable retainer means and is affixed to the latch release plunger so that the latch release plunger is moved through the clearance distance, against the bias of the latch spring, conjointly with movement of the fourth retainer means; and*

*the latch spring restores the latch release plunger and the fourth retainer means to their original positions to complete latching of the main plunger.*

*11. A latching solenoid according to claim 9, in which:*

*the third and fourth retainer means and their interconnecting shoulder are all integral parts of the latch release plunger.*

*12. A latching solenoid according to claim 9 in which:*

*the third retainer means comprises a rod extending axially through the main plunger and the latch release plunger;*

*the fourth retainer means comprises a sleeve slidably mounted on the rod; and*

*the third and fourth retainer means limit radial inward movement of the balls.*

*13. A latching solenoid according to claim 9, in which:*

*a rod extends axially through the main plunger and the latch release plunger, in sliding relation thereto, with one end of the rod terminating in a connection to the main plunger and the other end projecting outwardly beyond the latch release plunger to a position accessible for manual actuation; and*

*the main plunger is manually actuatable from its unactuated position to its latched, actuated position by pulling the rod axially outwardly.*

*14. A latching solenoid according to claim 13, in which:*

*a handle is mounted in encompassing relation to the outer end of the rod;*

*shoulder means, on the latch release plunger, are positioned for positive engagement by a portion of the handle; and*

*the latch release plunger is manually actuated from its normal position to its latch release position by pulling the handle axially outwardly against the bias of the latch spring.*

*15. A latching solenoid according to claim 14 in which:*

*the one end of the rod terminates in a bore in the main plunger;*

*resilient connection means, comprising an overtravel spring, interconnects the rod and the main plunger within the recess in the main plunger to permit limited relative axial movement therebetween, the overtravel spring being compressed when the main plunger is in its unactuated position; and*

*the overtravel spring restores the rod approximately to its original position when pulling on the rod is interrupted.*

* * * * *